US008317309B2

(12) United States Patent
Slotto et al.

(10) Patent No.: US 8,317,309 B2
(45) Date of Patent: Nov. 27, 2012

(54) WASTE PHASE CHANGE INK RECYCLING

(75) Inventors: Steven Ross Slotto, Camas, WA (US); Britton T. Pinson, Vancouver, WA (US); Clifford Alan Bell, Oregon City, OR (US); Steven Van Cleve Korol, Dundee, OR (US); Brian Edward Williams, Woodburn, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/422,799

(22) Filed: Mar. 16, 2012

(65) Prior Publication Data

US 2012/0176454 A1 Jul. 12, 2012

Related U.S. Application Data

(62) Division of application No. 12/274,903, filed on Nov. 20, 2008, now Pat. No. 8,162,465.

(51) Int. Cl.

| | |
|---|---|
| ***B41J 2/185*** | (2006.01) |
| ***B41J 2/175*** | (2006.01) |
| ***G01D 11/00*** | (2006.01) |

(52) U.S. Cl. ................................ 347/90; 347/88; 347/99

(58) Field of Classification Search ......................... None
See application file for complete search history.

(56) References Cited

U.S. PATENT DOCUMENTS

| | | | |
|---|---|---|---|
| 4,491,433 | A | 1/1985 | Shiurila et al. |
| 5,821,963 | A | 10/1998 | Sutera et al. |
| 7,048,353 | B2 | 5/2006 | Waller et al. |
| 2004/0114006 | A1 | 6/2004 | Phillips |
| 2005/0285917 | A1 | 12/2005 | Nichols et al. |
| 2006/0244799 | A1 | 11/2006 | Sasa et al. |

*Primary Examiner* — Geoffrey Mruk

(74) *Attorney, Agent, or Firm* — Maginot, Moore & Beck, LLP

(57) ABSTRACT

A system for recycling waste phase change ink in a phase change ink imaging device includes a printhead having an on-board phase change ink reservoir and a waste ink collector for receiving ink from an ejecting face of the printhead. The printhead is supplied ink from a remote ink reservoir, which is also fluidly connected to the waste ink collector by a waste phase change ink conveyor, which is configured to convey melted waste phase change ink from the waste ink collector to the remote ink reservoir.

4 Claims, 8 Drawing Sheets

WASTE PHASE CHANGE INK RECYCLING

PRIORITY CLAIM

This application is a divisional application of U.S. patent application Ser. No. 12/274,903, which was filed on Nov. 20, 2008, is entitled "Waste Phase Change Ink Recycling," and issued as U.S. Pat. No. 8,162,465 on Apr. 24, 2012.

CROSS-REFERENCE TO RELATED APPLICATIONS

Reference is made to commonly-assigned copending U.S. patent application Ser. No. 12/274,721, which is entitled "Waste Phase Change Ink Recycling," and which was filed on Nov. 20, 2008, the entire disclosure of which is expressly incorporated by reference herein.

TECHNICAL FIELD

This disclosure relates generally to phase change ink imaging devices, and, and, in particular, to the handling of waste ink in phase change ink imaging devices.

BACKGROUND

In general, ink jet printing machines or printers include at least one printhead that ejects drops or jets of liquid ink onto a recording or image forming media. A phase change ink jet printer employs phase change inks that are solid at ambient temperature, but transition to a liquid phase at an elevated temperature. The molten ink can then be ejected onto a printing media by a printhead directly onto an image receiving substrate, or indirectly onto an intermediate imaging member before the image is transferred to an image receiving substrate. Once the ejected ink is on the image receiving substrate, the ink droplets quickly solidify to form an image.

In various modes of operation, ink may be purged from the printheads to ensure proper operation of the printhead. When a solid ink printer is initially turned on, the solid ink is melted or remelted and purged through the printhead to clear the printhead of any solidified ink. The word "printer" as used herein encompasses any apparatus, such as digital copier, bookmaking machine, facsimile machine, multi-function machine, etc. that performs a print outputting function for any purpose. When ink is purged through the printhead, the ink flows down and off the face of the printhead typically to a waste ink tray or container positioned below the printhead where the waste ink is allowed to cool and re-solidify. The waste ink collection container is typically positioned in a location conveniently accessible so that the container may be removed and the waste ink discarded.

SUMMARY

As an alternative to discarding or disposing of waste phase change ink that is collected in a phase change ink imaging device, a system for recycling waste phase change ink in a phase change ink imaging device has been developed that includes a waste ink collector positioned within a phase change ink imaging device to collect waste phase change ink produced by a printhead in the phase change ink imaging device. The waste ink collector includes a heater for heating the waste phase change ink in the collector to at least a phase change ink melting temperature. A waste phase change ink conveyor is configured to convey melted waste phase change ink from the waste ink collector to an ink reservoir for the printhead.

In another embodiment, an imaging device includes a printhead having an on-board phase change ink reservoir for holding a quantity of melted phase change ink, and an ejecting face having a plurality of nozzles through which melted phase change ink from the on-board reservoir is ejected onto an image receiving surface. A remote ink reservoir is configured to hold a quantity of melted phase change and to deliver melted phase change ink to the on-board reservoir of the printhead. A waste ink collector is positioned to collect waste phase change ink produced by the printhead. The waste ink collector includes a heater for heating the waste phase change ink in the collector to at least a phase change ink melting temperature. A waste phase change ink conveyor is configured to convey melted waste phase change ink from the waste ink collector to at least one of the remote ink reservoir and the on-board ink reservoir for the printhead.

BRIEF DESCRIPTION OF THE DRAWINGS

The foregoing aspects and other features of the radiant heating unit and web heating systems incorporating radiant heating units are explained in the following description, taken in connection with the accompanying drawings, wherein.

DETAILED DESCRIPTION

Figure 1:
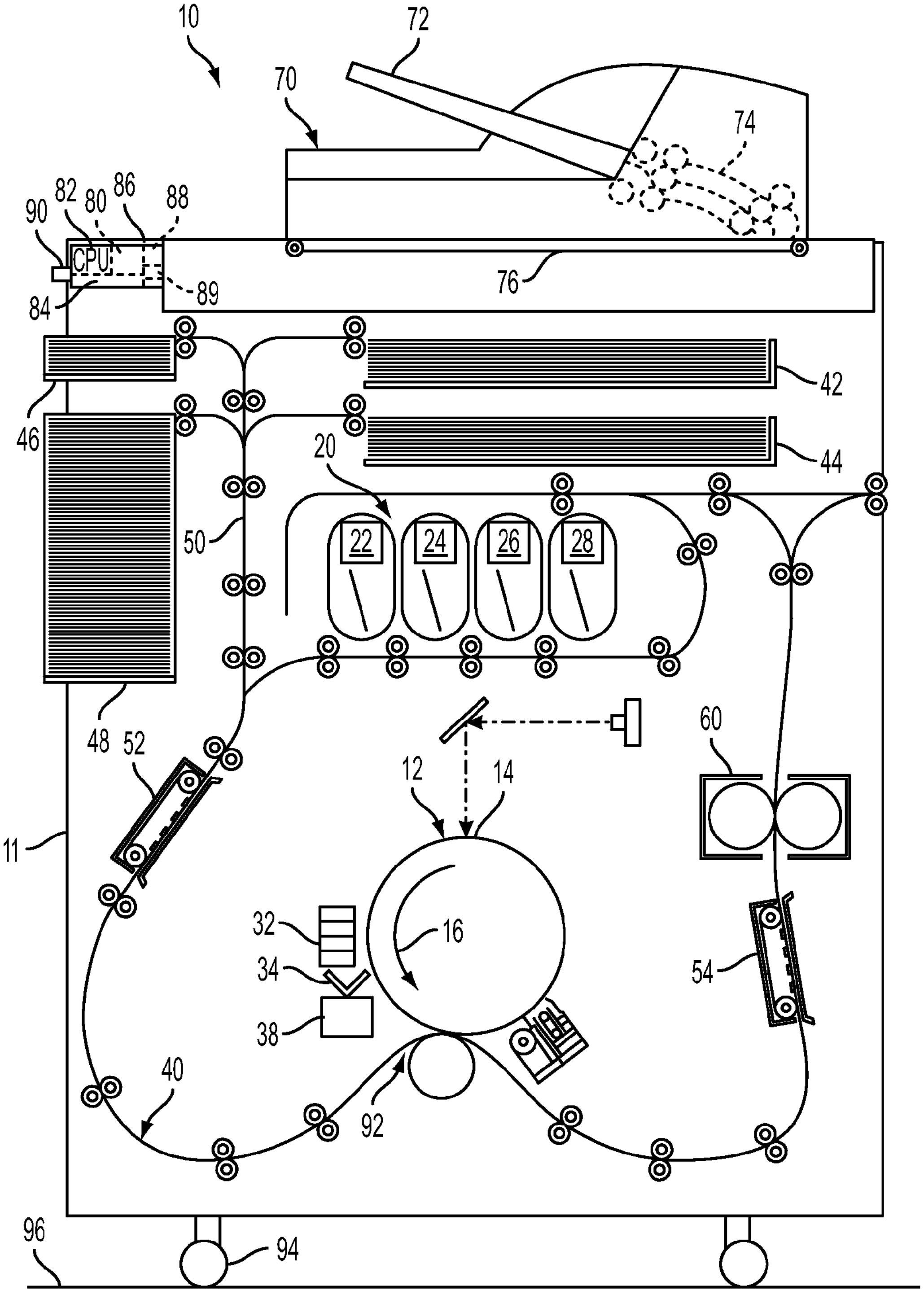
FIG. 1 (PRIOR ART)
FIG. 1 is block diagram of a phase change ink image producing machine.

For a general understanding of the present embodiments, reference is made to the drawings. In the drawings, like reference numerals have been used throughout to designate like elements.

As used herein, the term "imaging device" generally refers to a device for applying an image to print media. "Print media" can be a physical sheet of paper, plastic, or other suitable physical print media substrate for images, whether precut or web fed. The imaging device may include a variety of other components, such as finishers, paper feeders, and the like, and may be embodied as a copier, printer, or a multi-function machine. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the marking engine and may include text, graphics, pictures, and the like.

Referring now to FIG. 1, there is illustrated an image producing machine, such as the high-speed phase change ink image producing machine or printer 10 of the present invention. As illustrated, the machine 10 includes a frame 11 to which are mounted directly or indirectly all its operating subsystems and components, as will be described below. To start, the high-speed phase change ink image producing machine or printer 10 includes an imaging member 12 that is shown in the form of a drum, but can equally be in the form of a supported endless belt. The imaging member 12 has an imaging surface 14 that is movable in the direction 16, and on which phase change ink images are formed.

Figure 2:
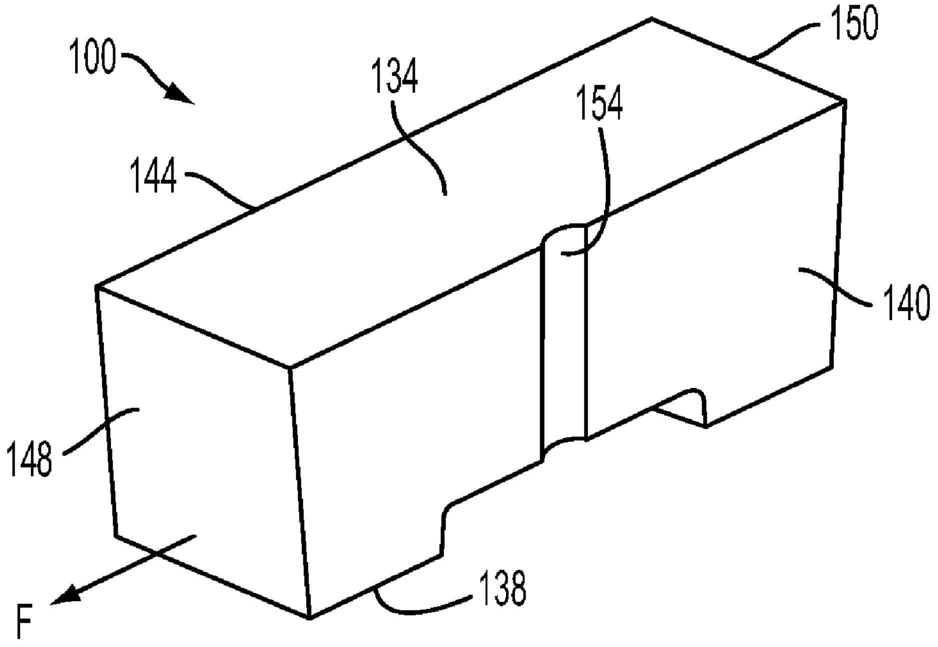
FIG. 2 is a perspective view of an embodiment of a solid ink stick for use with the image producing machine of FIG. 1.

The machine 10 includes a phase change ink system 20 that has at least one source 22 of one color phase change ink in solid form, referred to herein as ink sticks. An ink stick may take many forms. One exemplary solid ink stick 100 for use in the ink delivery system is illustrated in FIG. 2. The ink stick has a bottom surface 138 and a top surface 134. The particular bottom surface 138 and top surface 134 illustrated are substantially parallel one another, although they can take on other contours and relative relationships. Moreover, the surfaces of the ink stick body need not be flat, nor need they be parallel or perpendicular one another. The ink stick body also has a plurality of side extremities, such as lateral side surfaces 140, 144 and end surfaces 148, 150. The side surfaces 140 and 144 are substantially parallel one another, and are substantially perpendicular to the top and bottom surfaces 134, 138. The end surfaces 148, 150 are also basically substantially parallel one another, and substantially perpendicular to the top and bottom surfaces, and to the lateral side surfaces. One of the end surfaces 148 is a leading end surface, and the other end surface 150 is a trailing end surface. The ink stick body may be formed by pour molding, injection molding, compression molding, or other known techniques.

As illustrated, the machine 10 is a multicolor image producing machine, and the ink system 20 includes, e.g., four (4) sources 22, 24, 26, 28, representing four (4) different colors of phase change inks, e.g., CYMK (cyan, yellow, magenta, black). The phase change ink system 20 also includes a phase change ink melting and control assembly (not shown) for melting or phase changing the solid form of the phase change ink into a liquid form. Phase change ink is typically solid at room temperature. The ink melting assembly is configured to heat the phase change ink to a melting temperature selected to phase change or melt the solid ink to its liquid or melted form. Currently, common phase change inks are typically heated to about 100° C. to 140° C. to melt the solid ink for delivery to the printhead(s).

Thereafter, the phase change ink melting and control assembly then controls and supplies the molten liquid form of the ink towards a printhead system including at least one printhead or printhead assembly 32. Suitably, for a four (4) color multicolor image producing machine, the printhead system includes four (4) separate printhead assemblies, i.e., one for each color. However, for simplicity only one printhead assembly 32 is shown. Optionally, any suitable number of printheads or printhead assemblies may be employed.

As further shown, the phase change ink image producing machine or printer 10 includes a substrate supply and handling system 40. The substrate supply and handling system 40 for example may include substrate supply sources 42, 44, 46, 48, of which supply source 48 for example is a high capacity paper supply or feeder for storing and supplying image receiving substrates in the form of cut sheets for example. The substrate supply and handling system 40 in any case includes a substrate handling and treatment system 50 that has a substrate pre-heater 52, substrate and image heater 54, and a fusing device 60. The phase change ink image producing machine or printer 10 as shown may also include an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 for example is a self-contained, dedicated mini-computer having a central processor unit (CPU) 82, electronic storage 84, and a display or user interface (UI) 86. The ESS or controller 80 for example includes sensor input and control means 88 as well as a pixel placement and control means 89. In addition the CPU 82 reads, captures, prepares and manages the image data flow between image input sources such as the scanning system 76, or an online or a work station connection 90, and the printhead assemblies 32. As such, the ESS or controller 80 is the main multi-tasking processor for operating and controlling all of the other machine subsystems and functions, including the machine's printing operations.

In operation, image data for an image to be produced is sent to the controller 80 from either the scanning system 76 or via the online or work station connection 90 for processing and output to the printhead assemblies 32. Additionally, the controller determines and/or accepts related subsystem and component controls, for example from operator inputs via the user interface 86, and accordingly executes such controls. As a result, appropriate color solid forms of phase change ink are melted and delivered to the printhead assemblies. Additionally, pixel placement control is exercised relative to the imaging surface 14 thus forming desired images per such image data, and receiving substrates are supplied by anyone of the sources 42, 44, 46, 48 and handled by means 50 in timed registration with image formation on the surface 14. Finally, the image is transferred within the transfer nip 92, from the surface 14 onto the receiving substrate for subsequent fusing at fusing device 60.

Figure 3:
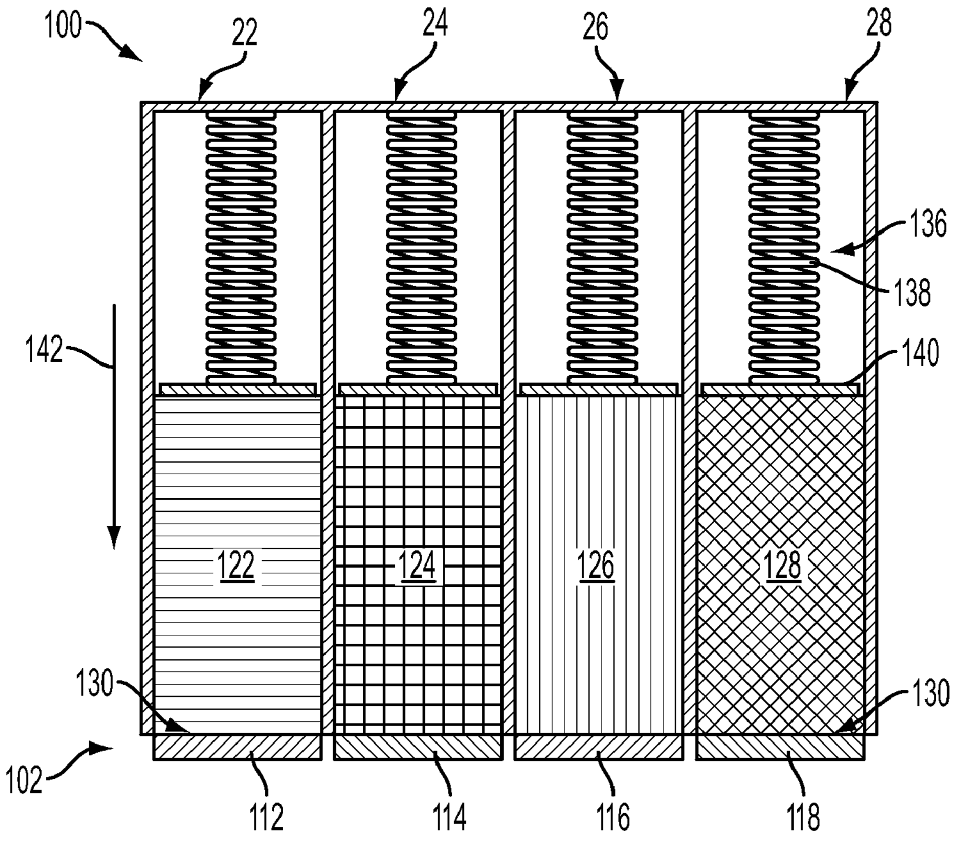
FIG. 3 is top view of four ink sources and a melter assembly having four melter plates.
Figure 4:
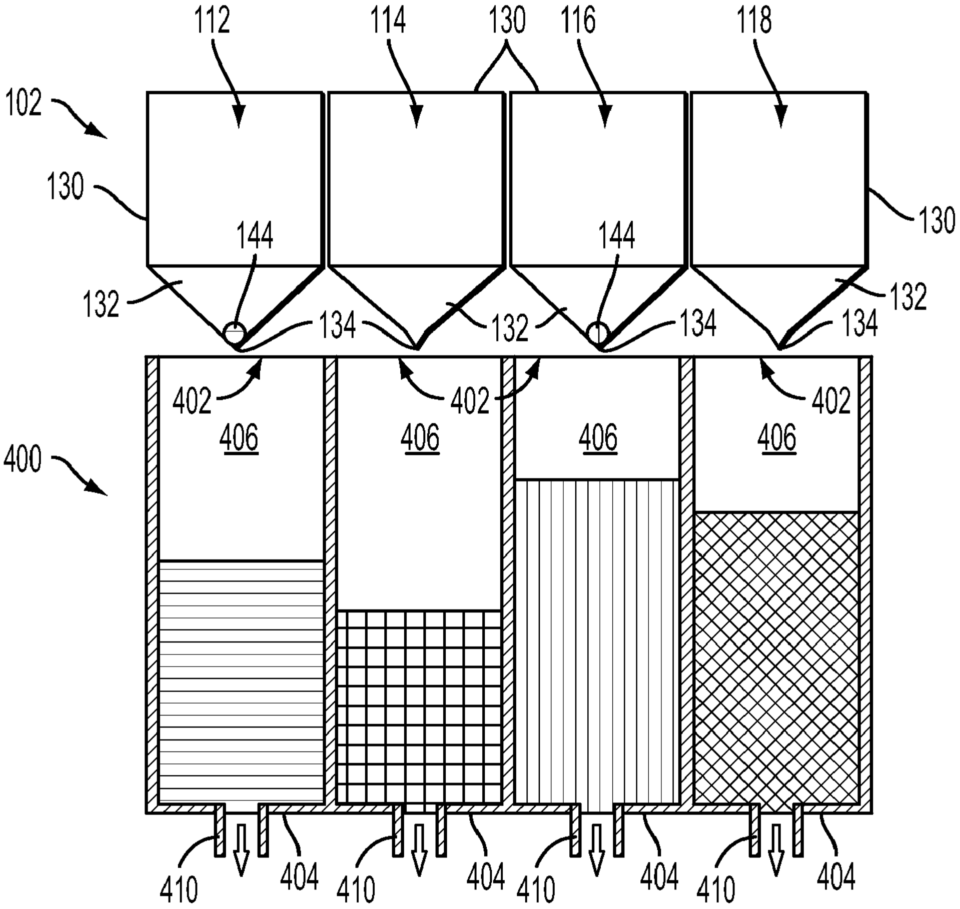
FIG. 4 is front side view of the four melter plates and the ink melting and control assembly.

Referring now to FIGS. 3 and 4, there is shown the ink delivery system 100 (FIG. 3) and ink storage and supply assembly 400 (FIG. 4) of the imaging device. The ink delivery system 100 of the present example includes four ink sources 22, 24, 26, 28, each holding a different phase change ink in solid form, such as for example inks of different colors. However, the ink delivery system 100 may include any suitable number of ink sources, each capable of holding a different phase change ink in solid form. The different solid inks are referred to herein by their colors as CYMK, including cyan 122, yellow 124, magenta 126, and black 128. Each ink source can include a housing (not shown) for storing each solid ink separately from the others. The solid inks are typically in block form, though the solid phase change ink may be in other formats, including but not limited to, pellets and granules, among others.

The ink delivery system 100 includes a melter assembly, shown generally at 102. The melter assembly 102 includes a melter, such as a melter plate, connected to the ink source for melting the solid phase change ink into the liquid phase. In the example provided herein, the melter assembly 102 includes four melter plates, 112, 114, 116, 118 each corresponding to a separate ink source 22, 24, 26 and 28 respectively, and connected thereto. As shown in FIG. 3, each melter plate 112, 114, 116, 118 includes an ink contact portion 130 and a drip point portion 132 extending below the ink contact portion and terminating in a drip point 134 at the lowest end. The drip point portion 132 can be a narrowing portion terminating in the drip point.

The melter plates 112, 114, 116, 118 can be formed of a thermally conductive material, such as metal, among others, that is heated in a known manner. In one embodiment, solid phase change ink is heated to about 100° C. to 140° C. to melt the phase change ink to liquid form for supplying to the liquid ink storage and supply assembly 400. As each color ink melts, the ink adheres to its corresponding melter plate 112, 114, 116 118, and gravity moves the liquid ink down to the drip point 134 which is disposed lower than the contact portion. The liquid phase change ink then drips from the drip point 134 in drops shown at 144. The melted ink from the melters may be directed gravitationally or by other means to the ink storage and supply assembly 400. The ink storage and supply system may be remote from the printheads of the printhead system. The ink storage and supply system 400 includes ink reservoirs 404 configured to hold quantities of melted ink from the corresponding ink sources/melters and to communicate the melted ink to one or more printheads as needed via a melted ink communication path. Each reservoir 404 of the ink storage and supply system 400 includes an opening 402 positioned below the corresponding melt plate configured to receive the melted ink and a chamber 406 below the opening configured to hold a volume of the melted ink received from the corresponding melt plate. The remote reservoirs 404 are each heated by a reservoir heater that may be a common heater for all of the reservoirs or a dedicated heater for each individual reservoir. The reservoir heater(s) may be internally or externally located with respect to the reservoirs and can rely on radiant, conductive, or convective heat to bring the ink in the reservoirs to at least the phase change melting temperature. It should be noted that the reservoirs and conduits which are a part of the phase change ink systems described, may be selectively heated to maintain an appropriate ink temperature range and such heating control may include temperature monitoring and adjustment of heating power and/or timing.

As mentioned, ink from a melt or melted ink holding reservoir is directed to at least one printhead via an ink supply path. The ink supply path may be any suitable device or apparatus capable of transmitting fluid such as melted ink from the remote ink reservoir to at least one printhead, and, in one embodiment, to an on-board ink reservoir of the a printhead. The ink supply path may be a conduit, for example, a trough, gutter, duct, tube or similar structure or enclosed pathway which may be externally or internally heated in any suitable manner, for example, to maintain phase change ink in liquid form. The term remote as used herein and as applicable to ink reservoirs refers to a reservoir that is separate or independent from the printhead on-board reservoir which feeds ink through passages to the image forming jets or nozzles. The remote reservoir feeds ink into a printhead on-board reservoir rather than to the imaging jets and may be physically associated with or integrated into the printhead or may supply ink to the printhead via a conduit interface. The on-board printhead reservoir and/or the remote reservoir may be compartmentalized to maintain separation of ink of different composition, such as colorant. The term melt reservoir may be used to distinguish the remote reservoir from the on-board printhead reservoir though either reservoir may be capable of melting or re-melting ink. It is to be understood that a printhead on-board reservoir may be used without secondary or remote reservoirs and that the waste ink recovery process may otherwise function as described, hence the term reservoir may be used to refer to either configuration.

Figure 5:
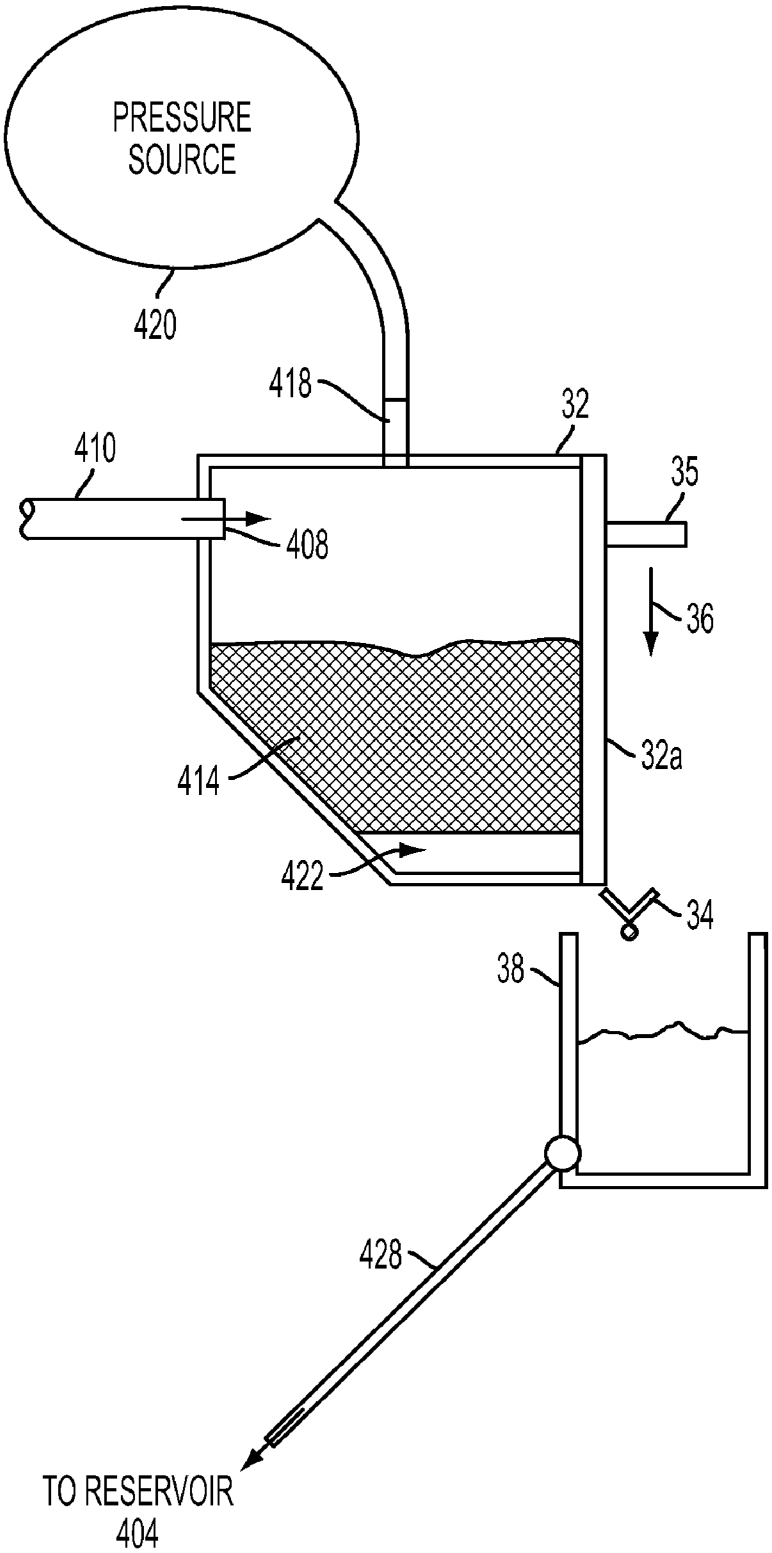
FIG. 5 is a diagrammatic illustration showing an embodiment of a printhead assembly and waste phase change ink conveyor.

In one embodiment, the ink supply path from remote ink reservoir 404 directs melted phase change ink to an on-board ink reservoir of at least one printhead. FIG. 5 shows an embodiment of a printhead 32 showing the printhead end 408 of the ink supply path 410 operably connected to on-board printhead reservoir 414. The on-board reservoir is configured to receive and hold a quantity of melted phase change ink for the printhead. Similar to the remote reservoirs 404 of the ink storage and supply system 400, the printhead assembly may include a printhead reservoir heater 422 that may be internally or externally located with respect to the reservoir 414 and can rely on radiant, conductive, or convective heat to bring or maintain the ink in the reservoirs at least the phase change melting temperature. The on-board reservoir 414 may be configured to hold any suitable amount of melted phase change ink for the printhead. The melted phase change ink is ejected by the printhead onto the imaging member by a plurality of ink ejectors (not shown), such as piezoelectric transducers, for example, through nozzles or apertures in the ink ejecting face 32*a* of the printhead.

The imaging device 10 may include a maintenance system for periodically performing a maintenance procedure on the printhead assembly. Maintenance procedures typically include purging ink through nozzles of the printhead, and wiping the nozzle plate to remove ink and debris from the surface of the nozzle plate. In one embodiment, in order to purge ink from the printhead, a positive pressure is applied to the melted phase change ink in the on-board printhead reservoir using a pressure source 420 through an opening, or vent, 418 causing the ink in the reservoir 414 to discharge through the nozzles of the ejecting face 32*a*. A scraper or wiper blade 35 may also be drawn across (e.g., in the direction indicated by the arrow 36) the ink ejecting face 32*a* of the printhead 32 to squeegee away any excess liquid phase change ink, as well as any paper, dust or other debris that has collected on the ejecting face.

In previously known imaging devices, the waste ink wiped-off or otherwise removed from the face of the printhead (typically, still in liquid from) is caught by a gutter 34 which ultimately channels or otherwise directs it toward a waste ink collection container where, e.g., it is allowed to cool and re-solidify. The container was then removed for disposal of the waste ink from the container. Alternately, the container may simply be disposed of and replaced with a new empty container.

As an alternative to collecting and disposing of waste phase change ink generated by the printheads of an imaging device, the present disclosure proposes a method and system for recycling or reusing the ink in the imaging device by directing the waste ink generated by a printhead back into the ink supply channel for that printhead. As used herein, waste ink refers to ink that has passed through a printhead of an imaging device that has not been deposited onto a print substrate. For example, waste ink includes ink that has been purged or flushed through a printhead and ink that has collected on the nozzle plate of printheads during imaging operations. FIG. 5 shows one basic embodiment of a system that enables waste phase change ink to be recycled. As depicted in FIG. 5, the waste ink is collected in a waste ink collector 424. Instead of removing a container and/or emptying its contents for disposal, the collector 424 is configured to route the waste ink from the container to the reservoir 404 for that printhead 32 via a waste ink return path 428. In the embodiment of FIG. 5, the waste ink return path 428 comprises a conduit that is configured to convey ink from the collector 424 to the reservoir 404 (FIG. 4). The waste ink return path 428 as well as the waste ink collector 424 may be heated by internal or external means in order to maintain waste phase change ink in liquid phase.

Figure 6:
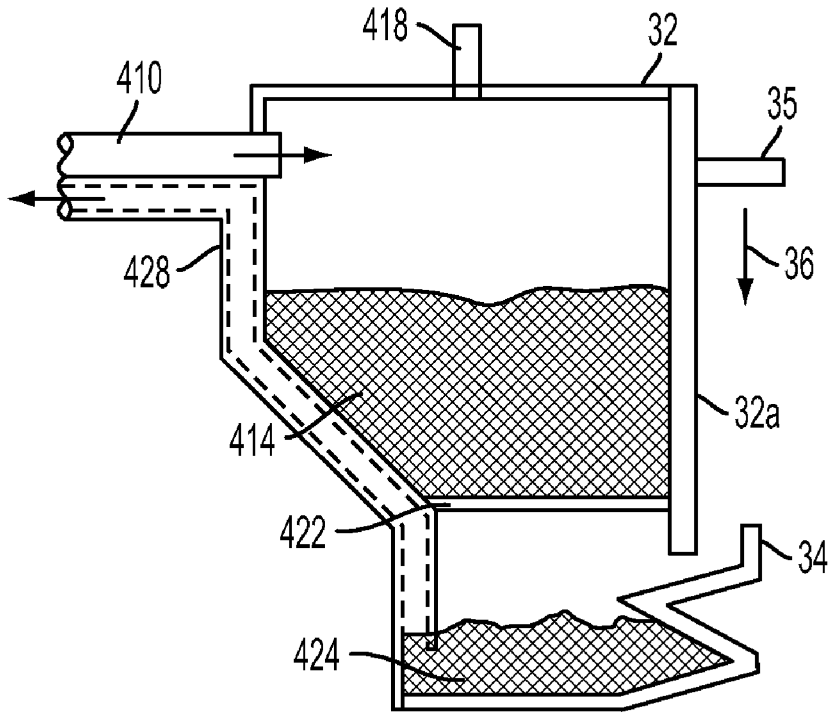
FIG. 6 is a diagrammatic illustration of a printhead having a sump chamber for collecting waste phase change ink.
Figure 7:
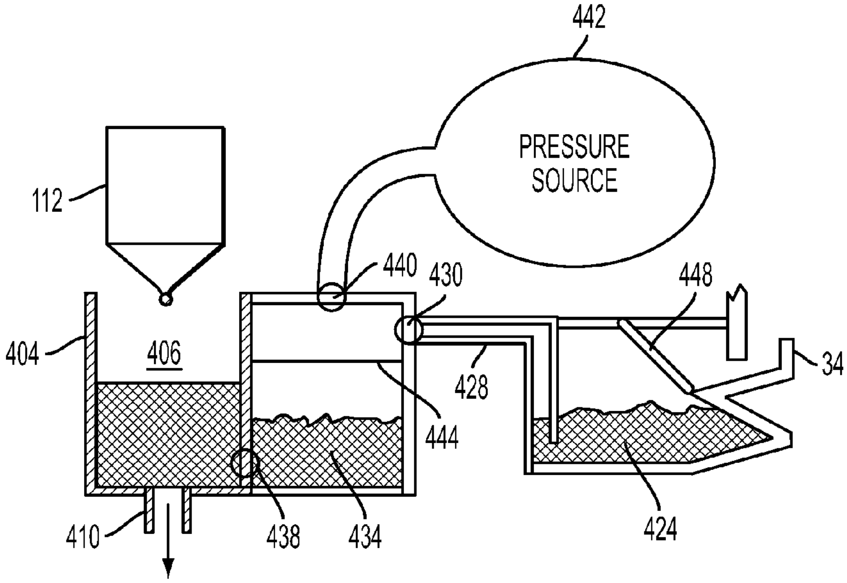
FIG. 7 is a schematic diagram of an embodiment of a system for recycling waste phase change ink in the imaging device of FIG. 1.

Referring now to FIGS. 6 and 7, another embodiment of a phase change ink recycling system for use in a phase change ink imaging device, such as the imaging device of FIG. 1, is illustrated. As discussed above in connection with FIG. 5, a positive pressure may be applied to the melted phase change ink in the on-board printhead reservoir through an opening, or vent, causing the ink in the reservoir to be purged through the nozzles of the ejecting face. A scraper or wiper blade 35 may also be drawn across (e.g., in the direction indicated by the arrow 36) the ink ejecting face 32*a* of the printhead 32 to squeeze or draw away any excess liquid phase change ink, as well as any paper, dust or other debris that has collected on the ejecting face.

As depicted in FIG. 6, the recycling system includes a trough, or gutter, 34 that is configured to capture waste ink, i.e., ink that is purged through the nozzles on the ejecting face of the printhead and/or wiped from the ejecting face using the wiper 35. Instead of directing the melted ink toward a removable waste ink container as described above, the gutter 34 of FIG. 6 is configured to direct waste ink to a waste ink collector 424. In the embodiment of FIG. 6, the waste ink collector comprises a sump chamber that is incorporated into the printhead assembly 32. The sump chamber 424 is located in the printhead assembly 32 below the on-board printhead reservoir 414. As an alternative to the use of a sump chamber 424 in the printhead assembly to collect the waste phase change ink, a chamber separate from the printhead assembly may be utilized. By incorporating the waste ink collector 424 into the printhead assembly, the waste ink collected in the sump may be heated to a phase change ink melting temperature by the heater 422 incorporated into the printhead assembly to maintain the ink in the on-bard reservoir in liquid phase, e.g. at or above the phase change ink melting temperature. In embodiments in which the waste ink is collected in a chamber separate from the printhead assembly, a dedicated heater may be provided to heat the waste ink in the collection chamber to at least the phase change ink melting temperature. A dedicated heater, however, may also be provided in the sump chamber of the printhead assembly if desired.

The ink recycling system includes a waste ink conveying system for directing or delivering the collected waste phase change ink back into the ink supply channel for the printhead. As used herein, an ink supply channel shall include the solid ink source, melting assembly, remote melt reservoir, printhead on-board reservoir, and any melted ink communication paths that link the remote reservoir and on-board reservoirs. In the embodiment of FIGS. 6 and 7, the recycling system is configured to direct ink collected in the sump 424 or other waste ink collection chamber to the remote melt reservoir 404 for the printhead. Accordingly, a waste ink return path 428 is included that fluidly connects the waste ink collection chamber to the melt reservoir 404. The waste ink return path 428 may be a conduit, tube, or umbilical, that may be internally or externally heated to ensure that the waste ink is maintained in liquid form as it is transmitted between the waste collection chamber and the melt reservoir.

In one embodiment, in order to draw ink out of the waste ink collection chamber to the melt reservoir, a negative pressure or vacuum may be applied to the opening at the melt reservoir end 430 of the conduit or tube that serves as the waste ink return path 428. In an alternative embodiment, collected waste ink may be conveyed or transported by other means, such as a conveyer or more conventional pump, in place of or in concert with negative or positive chamber pressurization. As depicted in FIG. 7, the melt reservoir 404 is provided with a high pressure chamber 434 having an opening operably coupled to an end 430 of the waste ink return path 428. The pressure chamber 434 includes an outlet opening 438 at or near a bottom portion of the chamber 434 through which received waste ink may flow to the reservoir chamber 406. Gravity, or liquid ink height, or pressurization, may serve as the driving force for causing the molten ink to exit the pressure chamber 434 through the outlet opening 438 and into the reservoir chamber 406. A negative pressure, or vacuum, may be applied to the pressure chamber using a pressure source 442 through an opening, or vent, 440 in the pressure chamber 434. The negative pressure in the pressure chamber draws the waste ink from the collection chamber and into the pressure chamber via the waste ink return path. To facilitate drawing ink from the waste ink collection chamber, a vent may be employed so that negative pressure can continue to be exerted. In an alternative embodiment, the waste ink collection chamber may be elastic such that it constricts as the fluid is drawn from it.

The inlet opening 430 that connects the pressure chamber 434 to the ink return path 428 may be provided with a check valve or other suitable backflow prevention means that is configured to open to permit the flow of molten ink from the collection chamber via the return path when the negative pressure is applied to the pressure chamber while preventing backflow of the ink through the opening 430 back toward the collection chamber. Similarly, the outlet opening 438 that connects the pressure chamber 434 and the melt reservoir chamber 406 may be provided with a one-way check valve that is configured to close when the negative pressure, or vacuum, is applied to the pressure chamber so that the waste ink may be drawn from the collector 424 into the pressure chamber 434. Flow path restrictions or check valves may be passive or controllably actuated. The recycling system may include one or more filters positioned at various locations for filtering gross contaminants, such as paper debris and dust, from the waste ink prior to the waste ink reaching the melt reservoir chamber. In one embodiment, a filter 444 is positioned in the pressure chamber 434 between the return path opening 430 and the discharge outlet 438. Additional or alternative filters 448 may be provided, for example, between the gutter and the collection chamber.

Figure 8:
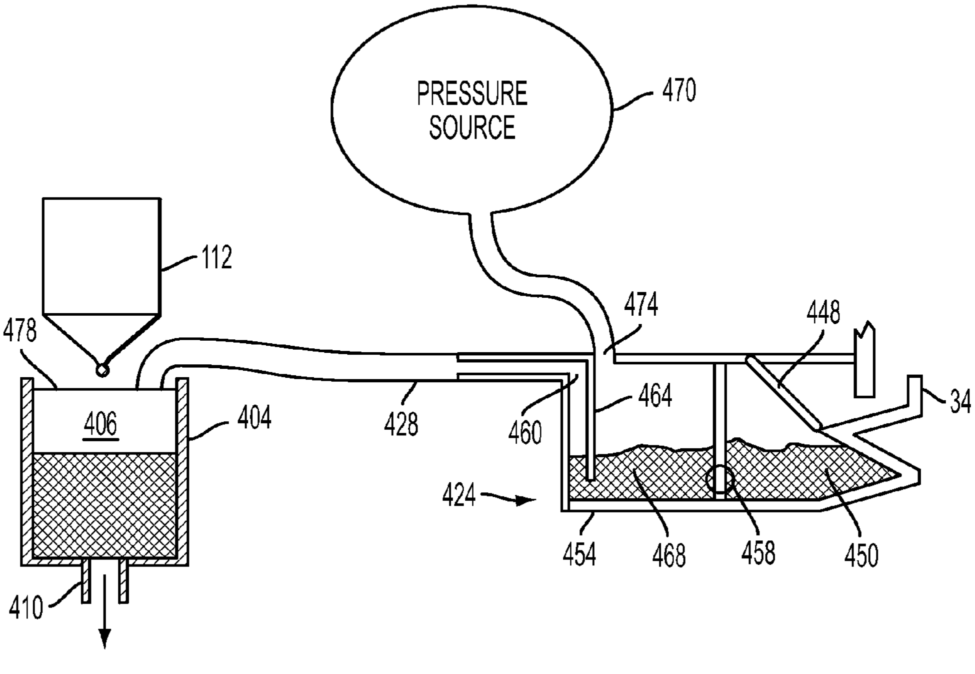
FIG. 8 is a schematic diagram of another embodiment of a system for recycling waste phase change ink in the imaging device of FIG. 1.

As an alternative to providing the remote reservoir 404 with a pressure chamber and applying a negative pressure, or vacuum, to the chamber to draw the waste ink from the collection chamber to the melt reservoir, the waste ink collector may be provided with a pressure chamber and positive pressure may applied to the ink in the pressure chamber of the collector to force ink from the pressure chamber to the reservoir. FIG. 8 shows an embodiment of a waste ink recycling system in which the collector is provided with a pressure chamber. As depicted in FIG. 8, the waste ink collector is in the form of a printhead sump chamber 424 incorporated into the printhead assembly but may also comprise a container or chamber separate from the printhead assembly. The waste ink collector 424 of FIG. 8 includes a low-pressure chamber and a high-pressure chamber. A trough, or gutter, 34 is configured to capture waste ink, i.e., ink that is purged through the nozzles on the ejecting face of the printhead and/or wiped from the ejecting face using the wiper, and direct the waste ink to the low-pressure chamber 450 of the waste ink collector 424. The high pressure chamber 454 and the low pressure chamber 450 of the collector are connected by an inlet opening 458 at or near a bottom portion of the high pressure 454 and low pressure chambers 450 through which received waste ink may flow to the high pressure chamber 454. Gravity, or liquid ink height, may serve as the driving force for causing the molten ink to exit the low pressure chamber 450 through the outlet opening 458 and into the high pressure chamber 454 of the collector. The low pressure chamber may be an open trough or container rather than being largely enclosed.

The high pressure chamber includes an outlet opening 460 that is operably connected to a collector end 464 of the waste ink return path 428. The collector end 464 of the waste ink return path 428 is positioned at a lower portion of the high pressure chamber 454 so that the collector end 464 may be submerged in the waste ink 468 that has collected there. The waste ink return path 428 extends to the remote melt reservoir 404. The waste ink return path 428 may be a conduit, tube, or umbilical, that may be internally or externally heated to ensure that the waste ink is maintained in liquid form as it is transmitted between the waste collection chamber and the melt reservoir. A positive pressure is applied to the high pressure chamber 454 of the collector using a pressure source 470 through a pressure port 474 in the high pressure chamber 454. The positive pressure in the pressure chamber 454 forces the waste ink from the high pressure chamber to the remote reservoir 404 via the waste ink return path 428.

The inlet opening 458 that connects the high pressure chamber 454 and the low pressure chamber 450 may be provided with a check valve that is configured to close when the positive pressure is applied to the high pressure chamber 454 so that the waste ink may be forced into the waste ink return path. The recycling system of FIG. 6 may include one or more filters positioned at various locations for filtering gross contaminants, such as paper debris and dust, from the waste ink prior to the waste ink reaching the melt reservoir chamber. In one embodiment, a filter 448 is positioned in the low pressure chamber between gutter the high pressure chamber. Additional or alternative filters 478 may be provided, for example, at the opening of the remote reservoir 404.

Figure 9:
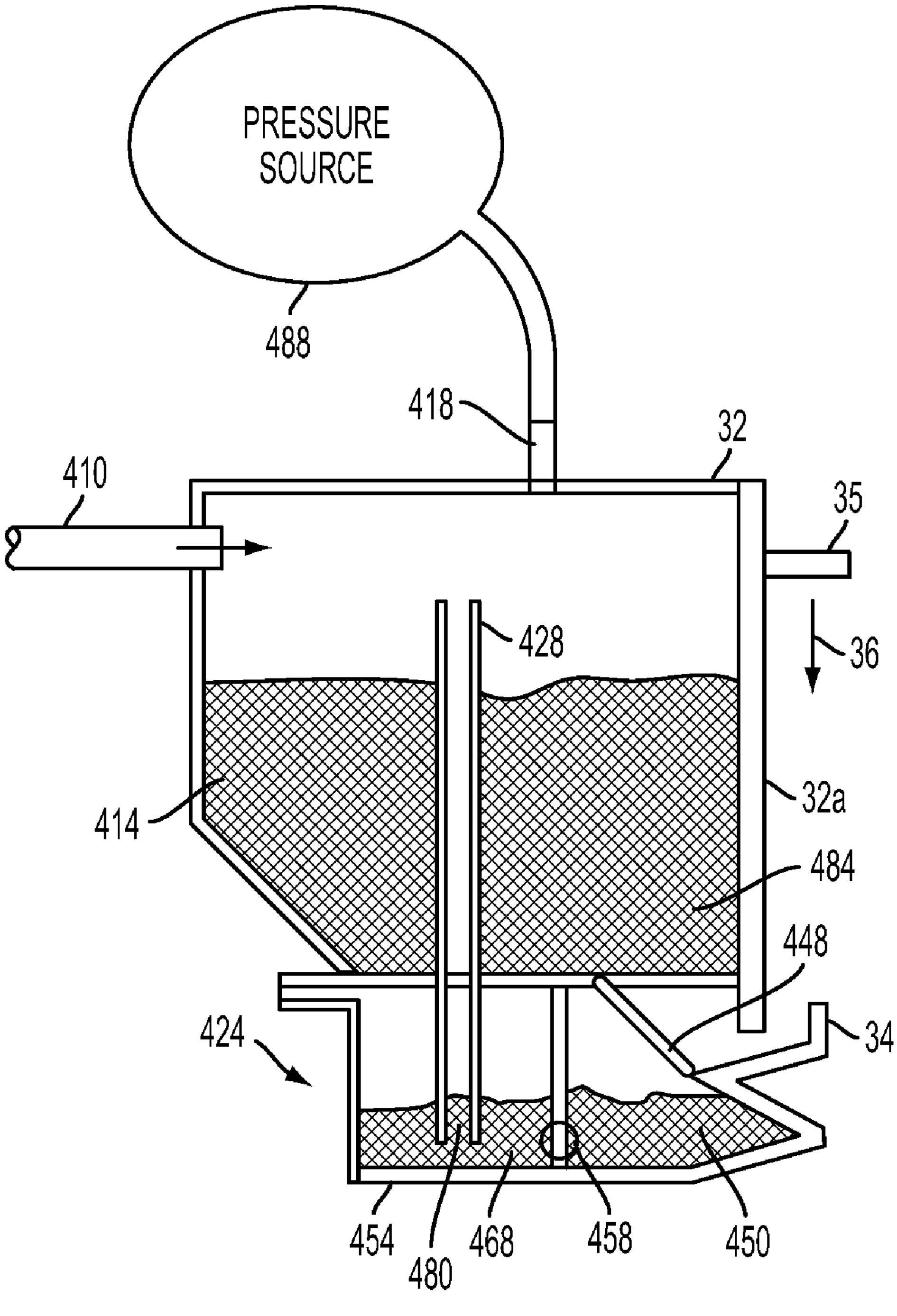
FIG. 9 is a schematic diagram of yet another embodiment of a system for recycling waste phase change ink in the imaging device of FIG. 1.

The embodiments of FIGS. 6-8 have been directed toward channeling the waste ink generated by a printhead back into the remote ink reservoir 404 for the printhead. FIG. 9 depicts an embodiment of a waste ink recycling system in which the waste ink is directed back into the on-board printhead reservoir 414 of the printhead assembly. In the embodiment of FIG. 9, the waste ink collector 424 is in the form of a printhead sump chamber incorporated into the printhead assembly 32 but may also comprise a container or chamber separate from the printhead assembly. As depicted in FIG. 9, the waste ink return path 428 extends from the high pressure chamber 454 to the on-board printhead reservoir 414. The waste ink return path 428 comprises a tube or conduit that includes a waste ink end 480 that is located at or near a bottom portion of the high pressure chamber 454 so as to be submerged in waste ink 468 that has collected there. In the embodiment of FIG. 8, the waste ink return path 428 is routed from the high pressure chamber 454 through the bottom of the on-board reservoir 414 and extends to an upper portion of the on-board reservoir 414 or to a point above the ink 484 that is contained in the on-board reservoir.

During a purge operation, a positive pressure may be applied to the melted phase change ink in the on-board printhead reservoir 414 using a pressure source 488 through an opening, or vent, 418 causing ink 484 in the reservoir 414 to be purged through the nozzles of the ejecting face 32*a*. A scraper or wiper blade 35 may also be drawn across (e.g., in the direction indicated by the arrow 36) the ink ejecting face 32*a* of the printhead 32 to squeeze or draw away any excess liquid phase change ink, as well as any paper, dust or other debris that has collected on the ejecting face. Similar to FIG. 8, the waste ink collector 424 includes a low-pressure chamber 450 and a high-pressure chamber 454. A trough, or gutter, is configured to capture waste ink, i.e., ink that is purged through the nozzles on the ejecting face of the printhead and/or wiped from the ejecting face using the wiper, and direct the waste ink to the low-pressure chamber of the waste ink collector. The high pressure chamber and the low pressure chamber of the collector are connected by an inlet opening 458 at or near a bottom portion of the high pressure and low pressure chambers through which received waste ink 468 may flow to the high pressure chamber. Gravity, or liquid ink height, may serve as the driving force for causing the molten ink to exit the low pressure chamber through the outlet opening and into the high pressure chamber of the collector. One or more filters 448 may be positioned at various locations for filtering contaminants, such as paper debris and dust, from the waste ink prior to the waste ink reaching the melt reservoir chamber.

The inlet opening 458 that connects the high pressure chamber 454 to the low pressure chamber 450 may be provided with a check valve that is configured to close when a positive pressure is applied to the on-board reservoir 414 so that ink from the on-board reservoir may be purged through the nozzles of the ejecting face of the printhead. When the positive pressure is removed from the on-board reservoir 414 the valve in the inlet opening between the high pressure chamber and the low pressure chamber opens to permit waste ink to enter into the high pressure chamber. A low pressure chamber may be at ambient pressure, be a positive pressure below the high pressure value or be a negative pressure and/or may vary through any portion of these ranges. High and low pressure designations are relative to applicable pressurized containers or flow path regions and need not be higher or lower than ambient pressure.

Chamber pressures may be inverted. A positive or negative pressure may be used to enable the waste ink 468 in the high pressure chamber 454 to flow through the waste ink return path 428 and into the on-board printhead reservoir 414. For example, in one embodiment, a negative pressure, or vacuum, may be applied to the waste ink return path opening in the on-board printhead reservoir using, for example, a pressure source, such as a vacuum generator, through an opening, or vent, in the on-board reservoir. The vent through which the negative pressure is introduced into the on-board printhead reservoir may be the same vent 418 through which the positive pressure is introduced. Accordingly, the pressure source 488 may be a bi-directional pressure source, vacuum source, or air pump that is configured to supply both positive and negative pressure to the on-board printhead reservoir 414. Separate pressure sources, however, may be used to introduce the positive and negative pressures into the on-board printhead reservoir. The negative pressure introduced into the on-board printhead reservoir draws the waste ink from the high pressure chamber 454 and into the on-board reservoir 414 via the waste ink return path 428.

As an alternative to using negative pressure introduced into the on-board reservoir to draw ink from the high pressure chamber of the collector into the on-board reservoir via the waste ink return path, a positive pressure may be introduced into the high pressure chamber 454 through a pressure port 490 in the high pressure chamber 454 using a pressure source (not shown). The positive pressure in the pressure chamber forces the waste ink from the high pressure chamber through the waste ink return path and into the on-board reservoir. In this embodiment, the inlet opening 458 between the high pressure chamber and the low pressure chamber of the collector may be provided with a check valve or similar structure that closes when the positive pressure is introduced into the high pressure chamber so that the ink in the high pressure chamber is forced through the waste ink return path to the on-boar reservoir.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An imaging device including:

a printhead having an on-board phase change ink reservoir for holding a quantity of melted phase change ink, and a plurality of nozzles in a faceplate of the printhead that are fluidly coupled to the on-board phase change ink reservoir to enable melted phase change ink to flow from the on-board phase change ink reservoir to the plurality of nozzles in the faceplate and through which the melted phase change ink is ejected onto an image receiving surface;

a remote ink reservoir configured to hold a quantity of melted phase change ink and to deliver melted phase change ink to the on-board phase change ink reservoir of the printhead;

a waste ink collector positioned to collect waste phase change ink that flows down the faceplate of the printhead in a direction that is perpendicular to a direction in which the melted phase change ink is ejected from the faceplate of the printhead, the waste ink collector comprising:

a heater that is configured to heat the waste phase change ink in the waste ink collector to at least a phase change ink melting temperature;

a sump located below the faceplate of the printhead that is configured to receive waste phase change ink from the faceplate of the printhead;

a first pressure chamber fluidly connected to the sump through a filter to receive filtered waste phase change ink from the sump; and a second pressure chamber fluidly connected to the first pressure chamber by an inlet opening in which a valve is positioned and, the second pressure chamber is fluidly connected to the remote ink reservoir by a waste ink return path; and a waste phase change ink conveyor configured to convey melted waste phase change ink from the second pressure chamber to the remote ink reservoir, the waste phase change ink conveyor comprising:

a positive pressure source operatively connected to the second pressure chamber to apply a positive pressure to the filtered waste phase change ink in the second pressure chamber that closes the valve to stop filtered waste phase change ink from returning to the first pressure chamber and that moves filtered waste phase change ink from the second pressure chamber through the waste ink return path to the remote ink reservoir, and the valve opening in response to the positive pressure source terminating application of positive pressure to the second pressure chamber to enable filtered waste phase change ink to enter the second pressure chamber from the first pressure chamber through the inlet opening and the valve; and a negative pressure source operatively connected to the on-board phase change ink reservoir to move filtered waste phase change ink from the remote ink reservoir to the on-board phase change ink reservoir.

2. The device of claim 1, the first pressure chamber further comprising: a filter positioned to filter the waste phase change ink prior to the waste phase change ink passing through the inlet opening into the second pressure chamber.

3. An imaging device including:

a printhead having an on-board ink reservoir for holding a quantity of liquid ink, and a plurality of nozzles in a faceplate of the printhead that are fluidly coupled to the on-board ink reservoir to enable liquid ink to flow from the on-board ink reservoir to the plurality of nozzles in the faceplate and through which the liquid ink is ejected onto an image receiving surface;

a remote ink reservoir configured to hold a quantity of liquid ink and to deliver liquid ink to the on-board ink reservoir of the printhead;

a waste ink collector positioned to collect waste liquid ink that flows down the faceplate of the printhead in a direction that is perpendicular to a direction in which the liquid ink is ejected from the faceplate of the printhead, the waste ink collector comprising:

a heater that is configured to heat the waste liquid ink in the waste ink collector;

a sump located below the faceplate of the printhead that is configured to receive waste liquid ink from the faceplate of the printhead;

a first pressure chamber fluidly connected to the sump through a filter to receive filtered liquid ink from the sump; and a second pressure chamber fluidly connected to the first pressure chamber by an inlet opening in which a valve is positioned and, the second pressure chamber is fluidly connected to the remote ink reservoir by a waste ink return path; and a waste liquid ink conveyor configured to convey waste liquid ink from the second pressure chamber to the remote ink reservoir, the waste liquid ink conveyor comprising:

a positive pressure source operatively connected to the second pressure chamber to apply a positive pressure to the filtered waste liquid ink in the second pressure chamber that closes the valve to stop filtered waste liquid ink from returning to the first pressure chamber and that moves filtered waste liquid ink from the second pressure chamber through the waste ink return path to the remote ink reservoir, and the valve opening in response to the positive pressure source terminating application of positive pressure to the second pressure chamber to enable filtered waste liquid ink to enter the second pressure chamber from the first pressure chamber through the inlet opening and the valve; and a negative pressure source operatively connected to the on-board ink reservoir to move filtered waste liquid ink from the remote ink reservoir to the on-board ink reservoir.

4. The device of claim 3, the first pressure chamber further comprising:

a filter positioned to filter the waste liquid ink prior to the waste liquid ink passing through the inlet opening into the second pressure chamber.

* * * * *